(12) United States Patent
Asai

(10) Patent No.: US 10,883,452 B2
(45) Date of Patent: Jan. 5, 2021

(54) CONTROL DEVICE FOR INTERNAL COMBUSTION ENGINE AND CONTROL METHOD FOR INTERNAL COMBUSTION ENGINE

(71) Applicant: YANMAR CO., LTD., Osaka-shi (JP)

(72) Inventor: Go Asai, Osaka (JP)

(73) Assignee: YANMAR POWER TECHNOLOGY CO., LTD., Osaka (JP)

( * ) Notice: Subject to any disclaimer, the term of this patent is extended or adjusted under 35 U.S.C. 154(b) by 175 days.

(21) Appl. No.: 16/316,873

(22) PCT Filed: Jun. 29, 2017

(86) PCT No.: PCT/JP2017/024046
§ 371 (c)(1),
(2) Date: Jan. 10, 2019

(87) PCT Pub. No.: WO2018/012306
PCT Pub. Date: Jan. 18, 2018

(65) Prior Publication Data
US 2019/0249626 A1    Aug. 15, 2019

(30) Foreign Application Priority Data

Jul. 14, 2016    (JP) .................................. 2016-139572

(51) Int. Cl.
*F02B 13/00*    (2006.01)
*F02M 25/14*    (2006.01)
(Continued)

(52) U.S. Cl.
CPC ............ *F02M 25/14* (2013.01); *B60W 10/06* (2013.01); *B60W 20/16* (2016.01); *F02B 51/02* (2013.01);
(Continued)

(58) Field of Classification Search
CPC . F02D 19/0671; F02M 26/36; F01N 2240/30; H01M 8/0618
(Continued)

(56) References Cited

U.S. PATENT DOCUMENTS 6,318,306 B1    11/2001   Komatsu
7,703,445 B2    4/2010    Haga
(Continued)

FOREIGN PATENT DOCUMENTS

DE          2322688 A1       11/1974
JP      2000-291499 A        10/2000
(Continued)

OTHER PUBLICATIONS

International Search Report dated Aug. 15, 2017 issued in corresponding PCT Application PCT/JP2017/024046.
(Continued)

*Primary Examiner* — Long T Tran
*Assistant Examiner* — James J Kim
(74) *Attorney, Agent, or Firm* — Norton Rose Fulbright US LLP

(57) ABSTRACT

An internal combustion engine in which a required reformed-fuel heat generation quantity (required output cylinder heat generation quantity) is calculated based on a required engine power and the thermal efficiency of an output cylinder. An estimated reformed fuel heat generation quantity is calculated based on the molar number of reformed fuel, mole fraction of each gas component in the reformed fuel, and heat generation quantity of each gas component in the reformed fuel. When a value resulting from subtracting the estimated reformed fuel heat generation quantity from the required reformed-fuel heat generation quantity is negative, a fuel reforming operation is not executed, assuming that there is a possibility that surplus (Continued)

reformed fuel may be generated. For example, a fuel supply from an injector to a fuel reformation chamber is stopped.

8 Claims, 4 Drawing Sheets

(51) Int. Cl.
*F02M 33/00* (2006.01)
*F02M 27/02* (2006.01)
*F02D 19/06* (2006.01)
*F02D 41/00* (2006.01)
*F02D 19/10* (2006.01)
*B60W 20/16* (2016.01)
*B60W 10/06* (2006.01)
*F02B 51/02* (2006.01)

(52) U.S. Cl.
CPC ..... *F02D 19/0607* (2013.01); *F02D 19/0626* (2013.01); *F02D 19/0642* (2013.01); *F02D 19/0671* (2013.01); *F02D 19/10* (2013.01); *F02D 41/0025* (2013.01); *F02D 41/0047* (2013.01); *F02M 27/02* (2013.01); *F02M 33/00* (2013.01); *F02D 41/0027* (2013.01); *F02D 41/0055* (2013.01)

(58) Field of Classification Search
USPC ........................................ 123/575
See application file for complete search history.

(56) References Cited

U.S. PATENT DOCUMENTS

| | | | |
|---|---|---|---|
| 2003/0089337 A1 | 5/2003 | Cohn et al. | |
| 2004/0035395 A1 | 2/2004 | Heywood et al. | |
| 2004/0065274 A1 | 4/2004 | Cohn et al. | |
| 2004/0099226 A1 | 5/2004 | Bromberg et al. | |
| 2004/0250790 A1 | 12/2004 | Heywood et al. | |
| 2006/0075991 A1 | 4/2006 | Heywood et al. | |
| 2009/0012698 A1 | 1/2009 | Shinagawa et al. | |
| 2010/0174470 A1 | 7/2010 | Bromberg et al. | |
| 2010/0206249 A1 | 8/2010 | Bromberg et al. | |
| 2011/0132290 A1* | 6/2011 | Leone ................... | F02D 9/08 123/3 |
| 2014/0196702 A1 | 7/2014 | Gingrich et al. | |
| 2017/0145966 A1* | 5/2017 | Yao ................... | F02M 26/04 |
| 2017/0284315 A1* | 10/2017 | Asai ................... | F02D 21/08 |
| 2017/0320482 A1* | 11/2017 | Leone ................... | B60W 10/08 |
| 2017/0333843 A1* | 11/2017 | Aoyagi ................ | F02M 26/36 |

FOREIGN PATENT DOCUMENTS

| | | |
|---|---|---|
| JP | 2005-226622 A | 8/2005 |
| JP | 2007-198273 A | 8/2007 |
| JP | 2010-001793 A | 1/2010 |
| JP | 4513809 B2 | 7/2010 |
| JP | 2014-136978 A | 7/2014 |
| JP | 2014-148946 A | 8/2014 |
| JP | 2015-108353 A | 6/2015 |
| WO | 2015/178327 A1 | 11/2015 |
| WO | 2016/035735 A1 | 3/2016 |

OTHER PUBLICATIONS

European Search Report dated Jun. 3, 2019 issued in corresponding EP Application 17827436.1.

* cited by examiner

CONTROL DEVICE FOR INTERNAL COMBUSTION ENGINE AND CONTROL METHOD FOR INTERNAL COMBUSTION ENGINE

CROSS REFERENCES TO RELATED APPLICATIONS

This application is a national stage application pursuant to 35 U.S.C. § 371 of International Application No. PCT/JP2017/024046, filed on Jun. 29, 2017 which claims priority under 35 U.S.C. § 119 to Japanese Patent Application No. 2016-139572 filed on Jul. 14, 2016, the disclosures of which are hereby incorporated by reference in their entireties.

TECHNICAL FIELD

The present invention relates to a control device for an internal combustion engine and a control method of an internal combustion engine. In particular, the present invention relates to a control device and a control method to be applied to an internal combustion engine including a fuel reformation device.

BACKGROUND ART

Traditionally, there has been known an internal combustion engine having a fuel reformation cylinder and an output cylinder (e.g., Patent Literature 1, hereinafter, PTL 1). This type of internal combustion engine reforms fuel in a fuel reformation cylinder. Then, the fuel after reformation (hereinafter, reformed fuel) is combusted in the output cylinder to obtain an engine power.

Specifically, a fuel such as light oil or heavy oil is supplied to the fuel reformation cylinder, and an air-fuel mixture having a high equivalence ratio is adiabatically compressed within the fuel reformation cylinder. As a result, the fuel is reformed under a high temperature and high pressure environment, and a reformed fuel (fuel with a high octane value) having a high anti-knock property such as hydrogen, carbon monoxide, and methane is generated. This reformed fuel is then supplied to the output cylinder together with the air, and the lean mixture is combusted (uniform lean combustion) in the output cylinder, to yield an engine power.

With this type of internal combustion engine, uniform lean combustion is performed in the output cylinder. The NOx emission amount and the soot discharge amount can therefore be reduced. Further, since a fuel with a high anti-knock property is combusted, knocking is suppressed or reduced, and since diesel micro-pilot ignition (ignition of reformed fuel by supplying a small amount of fuel into the output cylinder) enables combustion at a suitable timing, the combustion efficiency can be also improved.

CITATION LIST

Patent Literature

PTL 1: Japanese Patent Application Laid-Open No. 2014-136978

SUMMARY OF INVENTION

Technical Problem

To generate the reformed fuel in the fuel reformation cylinder as is described hereinabove, the equivalence ratio in the fuel reformation cylinder needs to be set high (reduce the amount of oxygen) so as to suppress or reduce oxidation reaction (combustion). Therefore, during a state where the reformed fuel is generated, the fuel reformation cylinder is in a fuel-rich state. As a result, at the time of generating the reformed fuel, a relatively large amount of reformed fuel is generated in accordance with the amount of fuel in the fuel reformation cylinder.

If a low-speed operation or a low-load operation of the internal combustion engine is performed, there is a possibility that the amount of reformed fuel generated in the fuel reformation cylinder may exceed the amount of the reformed fuel consumed (combusted) in the output cylinder. There is a possibility that a surplus of the reformed fuel (hereinafter, surplus reformed fuel) may occur.

The thermal efficiency of the internal combustion engine is lowered in a state where the surplus reformed fuel is generated. Further, the surplus reformed fuel is likely to be emitted to the atmosphere, because it is not consumed in the output cylinder. Therefore, the surplus reformed fuel is not desirable in terms of the environment protection.

Such a problem may take place not only in an internal combustion engine which generate reformed fuel by a fuel reformation cylinder, but also in an internal combustion engine which generates reformed fuel with a use of a fuel reforming catalyst. Hereinafter, the fuel reformation cylinder and the fuel reforming catalyst will be collectively referred to as a fuel reformation device.

The present invention is made in view of the above problems, and it is an object of the present invention to provide a control device and a control method for an internal combustion engine having a fuel reformation device and an output cylinder, the control device and the control method capable of suppressing or reducing surplus reformed fuel.

Solution to Problem

A solution of the present invention to achieve the above-described object premises a control device to be applied to an internal combustion engine including a fuel reformation device capable of generating reformed fuel through a fuel reforming operation and an output cylinder to which the reformed fuel generated in the fuel reformation device is supplied, the output cylinder configured to yield an engine power by combusting the reformed fuel. The control device for the internal combustion engine includes a reforming operation control unit configured not to execute the fuel reforming operation in the fuel reformation device, when a total heat generation quantity on assumption that reformed fuel generated within a predetermined period in the fuel reformation device is combusted is estimated as to be more than a required reformed-fuel heat generation quantity required in the predetermined period for the output cylinder.

The required reformed-fuel heat generation quantity is a required value of a heat generation quantity obtained by combustion of reformed fuel within the predetermined period in the output cylinder. For example, in cases where the fuel reformation device is structured by a reciprocating type fuel reformation cylinder having a piston crank mechanism, the above predetermined period is a period corresponding to 1 cycle of the fuel reformation cylinder.

With the above structure, when a total heat generation quantity on assumption that the reformed fuel generated within a predetermined period in the fuel reformation device is combusted is estimated as to be more than a required reformed-fuel heat generation quantity required in the predetermined period for the output cylinder, the reforming operation control unit does not execute the fuel reforming operation in the fuel reformation device. Thus, an amount of reformed fuel that exceeds an amount of reformed fuel consumed in the output cylinder is suppressed or reduced from being generated in the fuel reformation device. In other words, generation of surplus reformed fuel is suppressed or reduced. Therefore, a drop in the thermal efficiency of the internal combustion engine can be suppressed or reduced, and emission of the reformed fuel to the atmosphere can be suppressed or reduced.

The total heat generation quantity on assumption that the reformed fuel generated within the predetermined period in the fuel reformation device is combusted is preferably calculated based on at least an amount of gas introduced to the fuel reformation device and a quantity of fuel supplied to the fuel reformation device.

The total heat generation quantity on assumption that the reformed fuel generated within the predetermined period in the fuel reformation device is combusted may be calculated based on at least the temperature and the pressure of gas from the fuel reformation device.

With these solutions, the amount of reformed fuel generated in the fuel reformation device (equivalent to the total heat generation quantity on assumption that the reformed fuel generated in the fuel reformation device is combusted) is combusted can be accurately calculated. As a result, the timing for not executing the fuel reforming operation in the fuel reformation device can be suitably determined.

Further, the reforming operation control unit is preferably configured to determine whether the total heat generation quantity on assumption that the reformed fuel generated within the predetermined period in the fuel reformation device is combusted is more than the required reformed-fuel heat generation quantity required for the predetermined period in the output cylinder, only when each of a rotational speed and a load of the output cylinder is less than a predetermined threshold value, and configured not to execute the fuel reforming operation in the fuel reformation device, if the total heat generation quantity is estimated as to be more than the required reformed-fuel heat generation quantity.

With this structure, whether the total heat generation quantity is more than the required reformed-fuel heat generation quantity is determined only in an operation area that causes a higher possibility of generating an amount of reformed fuel in the fuel reformation device, the amount of reformed fuel exceeding an amount of reformed fuel consumed in the output cylinder, i.e., only in an operation area that causes a high possibility of generating surplus reformed fuel (operation area in which the rotational speed and the load of the output cylinder is less than a predetermined threshold value). In other words, the above process of determination is not performed in an operation area that leads to a low possibility of generating the surplus reformed fuel. This way, unnecessary determination process is avoided, and reduces the burden in computation in the control device.

Further, when the fuel reforming operation in the fuel reformation device is not executed, fuel supply to the fuel reformation device is preferably stopped, and an amount of fuel within a range that allows fuel combustion and that makes an equivalence ratio less than 1 is preferably supplied to the output cylinder.

Further, when the fuel reforming operation is not executed, generation of the reformed fuel is stopped in the fuel reformation device by stopping fuel supply to the fuel reformation device. Therefore, the surplus reformed fuel is not generated. Further, by supplying an amount of fuel that enables fuel combustion to the output cylinder, an engine power can be obtained by the fuel combustion.

Further, when the fuel reforming operation in the fuel reformation device is not executed, an amount of fuel within a range that allows fuel combustion and that makes an equivalence ratio less than 1 may be supplied to the fuel reformation device and the output cylinder.

With this, the fuel is combusted in the fuel reformation device, and reformed fuel is not generated, or little reformed fuel will be generated. Further, even when the fuel reforming operation is not executed, combustion of the fuel in the fuel reformation device suppresses or reduces a drop in the temperature of the fuel reformation device. When the temperature of the fuel reformation device drops and the gas temperature in the fuel reformation device becomes less than the reforming operation enabling temperature, reformed fuel may not be generated when the fuel reforming operation is restarted. However, the present solution maintains the temperature of the fuel reformation device high, even when the fuel reforming operation is not executed. Therefore, reformed fuel can be favorably generated when the fuel reforming operation is restarted.

It is preferable that: the output cylinder is structured as a reciprocation type in which a piston reciprocates in the cylinder; the ignition timing of the reformed fuel in the output cylinder is controlled by fuel supply to the output cylinder or spark ignition; and the reforming operation control unit is configured to evaluate, as the required reformed-fuel heat generation quantity, a value resulting from subtracting a quantity of heat generated by combustion of ignition timing controlling fuel that is for controlling the ignition timing and that is supplied in the predetermined period, from a total heat generation quantity required for the predetermined period in the output cylinder, and configured not to execute the fuel reforming operation in the fuel reformation device, when the total heat generation quantity on assumption that the reformed fuel generated within the predetermined period in the fuel reformation device is combusted is estimated as to be more than the required reformed-fuel heat generation quantity.

When the fuel for controlling the ignition timing is supplied (injected) to the output cylinder, the required reformed-fuel heat generation quantity (the heat generation quantity required by combustion of the reformed fuel in the output cylinder) can be less by the heat generation quantity attributed to the combustion of the fuel in the output cylinder. In short, the amount of reformed fuel to be generated in the fuel reformation device can be reduced. Taking this into account, in the present solution, the required reformed-fuel heat generation quantity is evaluated as a value resulting from subtracting a quantity of heat generated by combustion of ignition timing controlling fuel that is for controlling the ignition timing and that is supplied in the predetermined period, from a total heat generation quantity required for the predetermined period in the output cylinder. Further, the fuel reforming operation in the fuel reformation device is not executed, when the total heat generation quantity on assumption that the reformed fuel generated within the predetermined period in the fuel reformation device is combusted is estimated as to be more than a required reformed-fuel heat generation quantity. Thus, while ignition timing of the reformed fuel in the output cylinder is controlled, an amount of reformed fuel that exceeds an amount of reformed fuel consumed in the output cylinder is suppressed or reduced from being generated in the fuel reformation device. Therefore, generation of surplus reformed fuel can be suppressed or reduced.

Further, the scope of the technical thought of the present invention encompasses a control method for the internal combustion engine implemented by the control device for the internal combustion engine according to each of the above described solutions. Namely, it is premised that a control method is applied to an internal combustion engine including a fuel reformation device capable of generating reformed fuel through a fuel reforming operation and an output cylinder to which the reformed fuel generated in the fuel reformation device is supplied, the output cylinder configured to yield an engine power by combusting the reformed fuel. In the control method for the internal combustion engine, the fuel reforming operation in the fuel reformation device is not executed, when a total heat generation quantity on assumption that reformed fuel generated within a predetermined period in the fuel reformation device is combusted is estimated as to be more than a required reformed-fuel heat generation quantity required in the predetermined period for the output cylinder.

With this control method, an amount of reformed fuel that exceeds an amount of reformed fuel consumed in the output cylinder is suppressed or reduced from being generated in the fuel reformation device, as is described hereinabove. Therefore, a drop in the thermal efficiency of the internal combustion engine can be suppressed or reduced, and emission of the reformed fuel to the atmosphere can be suppressed or reduced.

Advantageous Effects of Invention

In the present invention, the fuel reforming operation in the fuel reformation device is not executed, when the total heat generation quantity on assumption that the reformed fuel generated within the predetermined period in the fuel reformation device is combusted is estimated as to be more than a required reformed-fuel heat generation quantity required for a predetermined period in the output cylinder. Therefore, an amount of reformed fuel that exceeds an amount of reformed fuel consumed in the output cylinder is suppressed or reduced from being generated in the fuel reformation device, and generation of the surplus reformed fuel is restrained. As a result, a drop in the thermal efficiency of the internal combustion engine can be suppressed or reduced, and emission of the reformed fuel to the atmosphere can be suppressed or reduced.

DESCRIPTION OF EMBODIMENTS

The following describes an embodiment of the present invention based on the attached drawings. The present embodiment deals with a case where the present invention is applied to an internal combustion engine for a ship.

—System Structure of Internal Combustion Engine—

Figure 1:
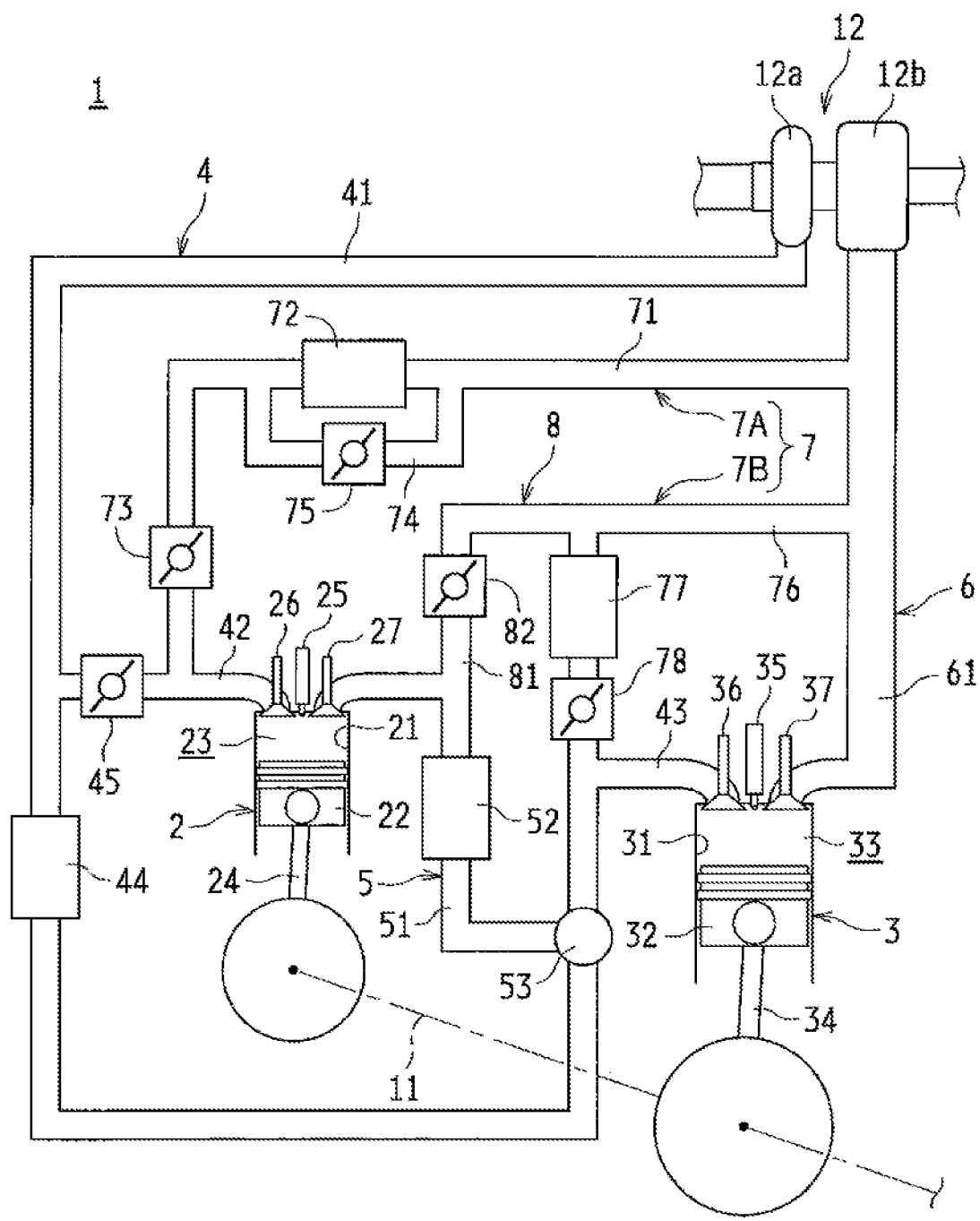
FIG. 1 A diagram showing a system structure of an internal combustion engine related to an embodiment.

FIG. 1 is a diagram showing a system structure of an internal combustion engine related to the present embodiment.

As shown in FIG. 1, the internal combustion engine 1 according to the present embodiment includes a fuel reformation cylinder 2 serving as a fuel reformation device of the present invention and an output cylinder 3. Further, the internal combustion engine 1 includes, as a piping system for supplying (introducing) gas or discharging (leading out) a gas to and from the fuel reformation cylinder 2 and the output cylinder 3, an air-intake system 4, a reformed fuel supply system 5, an exhaust system 6, an EGR system 7, and an output cylinder bypass system 8.

(Fuel Reformation Cylinder and Output Cylinder)

The fuel reformation cylinder 2 and the output cylinder 3 are both structured as a reciprocation type. Specifically, the cylinders 2, 3 have, in their cylinder bores 21, 31 formed in a cylinder block (not shown), pistons 22, 32 in such a manner as to be able to reciprocate, respectively. In the fuel reformation cylinder 2, a fuel reformation chamber 23 is formed by the cylinder bore 21, the piston 22, and a not-shown cylinder head. In the output cylinder 3, a combustion chamber 33 is formed by the cylinder bore 31, the piston 32, and a not-shown cylinder head.

The internal combustion engine 1 of the present embodiment includes four cylinders in the cylinder block, and one of the cylinders is structured as the fuel reformation cylinder 2, whereas three other cylinders are structured as the output cylinder 3. Reformed fuel generated by the fuel reformation cylinder 2 is supplied to each output cylinder 3. The numbers of the cylinders 2, 3 are not limited to the above. For example, the cylinder block may include six cylinders, and two of the cylinders are structured as the fuel reformation cylinder 2, whereas four other cylinders are structured as the output cylinder 3.

The pistons 22, 32 of the cylinders 2, 3 are connected to a crankshaft 11 through connecting rods 24, 34, respectively. This way, the motion is converted from reciprocation of the pistons 22, 32 to rotation of the crankshaft 11. The crankshaft 11 can be connected to a screw shaft of the ship through a clutch mechanism (not shown). The piston 22 of the fuel reformation cylinder 2 and the piston 32 of the output cylinder 3 are connected to each other through the connecting rods 24, 34 and the crankshaft 11. This enables power transmission between the cylinders 2, 3, transmission of output power from the cylinders 2, 3 to the screw shaft, and the like.

The fuel reformation cylinder 2 includes an injector 25 configured to supply a pre-reformed fuel such as light oil to the fuel reformation chamber 23. With supply of fuel from the injector 25, the fuel reformation chamber 23 adiabatically compresses air-fuel mixture with a high equivalence ratio. As a result, the fuel is reformed under a high temperature and high pressure environment, and a reformed fuel having a high anti-knock property such as hydrogen, carbon monoxide, and methane is generated.

The output cylinder 3 includes an injector 35 configured to supply a fuel such as light oil to the combustion chamber 33. To the combustion chamber 33, the reformed fuel generated in the fuel reformation cylinder 2 is supplied together with the air. Then, premixed combustion of the lean mixture is performed in the combustion chamber 33. This way, the crankshaft 11 rotates with reciprocation of the piston 32, and an engine power is obtained.

(Air-Intake System)

The air-intake system 4 is configured to introduce air (fresh air) to the fuel reformation chamber 23 of the fuel reformation cylinder 2 and the combustion chamber 33 of the output cylinder 3.

The air-intake system 4 includes a main air-intake passage 41. This main air-intake passage 41 is branched into two systems: i.e., a fuel reformation cylinder air-intake passage 42 and an output cylinder air-intake passage 43. The main air-intake passage 41 includes a compressor wheel 12a of a turbocharger 12. The fuel reformation cylinder air-intake passage 42 communicates with the air-intake port of the fuel reformation cylinder 2. Between this air-intake port and the fuel reformation chamber 23 of the fuel reformation cylinder 2, an air-intake valve 26 that can open/close is arranged. Further, the fuel reformation cylinder air-intake passage 42 includes an air-intake amount adjust valve 45 whose opening degree is adjustable. The output cylinder air-intake passage 43 communicates with an air-intake port of the output cylinder 3. Between this air-intake port and the combustion chamber 33 of the output cylinder 3, an air-intake valve 36 that can open/close is arranged. Further, the output cylinder air-intake passage 43 includes an intake-air cooler (inter cooler) 44.

(Reformed Fuel Supply System)

The reformed fuel supply system 5 supplies reformed fuel generated in the fuel reformation cylinder 2 to the combustion chamber 33 of the output cylinder 3.

The reformed fuel supply system 5 includes a reformed fuel supply passage 51 The reformed fuel supply passage 51 includes a reformed fuel cooler 52. An upstream end of the reformed fuel supply passage 51 communicates with the exhaust port of the fuel reformation cylinder 2. Between this exhaust port and the fuel reformation chamber 23 of the fuel reformation cylinder 2, an exhaust valve 27 that can open/close is arranged. A downstream end of the reformed fuel supply passage 51 communicates with the output cylinder air-intake passage 43. In a communicating portion between the reformed fuel supply passage 51 and the output cylinder air-intake passage 43, a mixer 53 is provided. In the mixer 53, the reformed fuel generated by the fuel reformation cylinder 2 is mixed with the air flowing through the output cylinder air-intake passage 43, and is supplied to the combustion chamber 33 of the output cylinder 3.

(Exhaust System)

The exhaust system 6 is configured to discharge exhaust gas generated in the output cylinder 3. The exhaust system 6 includes an exhaust passage 61. The exhaust passage 61 includes a turbine wheel 12b of the turbocharger 12. The exhaust passage 61 communicates with an exhaust port of the output cylinder 3. Between this exhaust port and the combustion chamber 33 of the output cylinder 3, an exhaust valve 37 that can open/close is arranged.

(EGR System)

An EGR system 7 includes a fuel reformation cylinder EGR system 7A and an output cylinder EGR system 7B.

The fuel reformation cylinder EGR system 7A is configured to direct and supply a part of exhaust gas to the fuel reformation chamber 23 of the fuel reformation cylinder 2, the exhaust gas flowing through the exhaust passage 61. The fuel reformation cylinder EGR system 7A includes a fuel reformation cylinder EGR passage 71. The fuel reformation cylinder EGR passage 71 has its upstream end communicated with the exhaust passage 61, and has its downstream end communicated with the downstream side of the air-intake amount adjust valve 45 in the fuel reformation cylinder air-intake passage 42, respectively. The fuel reformation cylinder EGR passage 71 includes an EGR gas cooler 72. On the downstream side of the EGR gas cooler 72 in the fuel reformation cylinder EGR passage 71 (in a position closer to the fuel reformation cylinder air-intake passage 42), an EGR gas amount adjusting valve 73 is provided. Further, the fuel reformation cylinder EGR system 7A is provided with a cooler bypass passage 74 for letting the EGR gas bypassing the EGR gas cooler 72. In the cooler bypass passage 74, a bypass amount adjusting valve 75 is provided.

The output cylinder EGR system 7B is configured to return a part of exhaust gas to the combustion chamber 33 of the output cylinder 3, the exhaust gas flowing through the exhaust passage 61. The output cylinder EGR system 7B includes an output cylinder EGR passage 76. The output cylinder EGR passage 76 has its upstream end communicated with the exhaust passage 61, and has its downstream end communicated with the downstream side of a mixer 53 in the output cylinder air-intake passage 43, respectively. The output cylinder EGR passage 76 includes an EGR gas cooler 77. On the downstream side of the EGR gas cooler 77 in the output cylinder EGR passage 76 (in a position closer to the output cylinder air-intake passage 43), an EGR gas amount adjusting valve 78 is provided.

(Output Cylinder Bypass System)

The output cylinder bypass system 8 is used to introduce exhaust gas from the fuel reformation cylinder 2 into the exhaust passage 61 without supplying the gas to the output cylinder 3 (i.e., by bypassing the output cylinder 3). The output cylinder bypass system 8 includes an output cylinder bypass passage 81. The output cylinder bypass passage 81 has its upstream end communicated with the upstream side of a reformed fuel cooler 52 in a reformed fuel supply passage 51, and has its downstream end communicated with the upstream side of the EGR gas cooler 77 (the side close to the exhaust passage 61) in the output cylinder EGR passage 76. Further, the output cylinder bypass passage 81 includes a bypass amount adjusting valve 82.

For the coolers 44, 52, 72, 77 provided in each of the above-described systems, engine cooling water, seawater, or the like is used as a cooling heat source for cooling the gas. Further, the coolers 44, 52, 72, 77 may be of an air-cooled type.

—Control System of Internal Combustion Engine—

Figure 2:
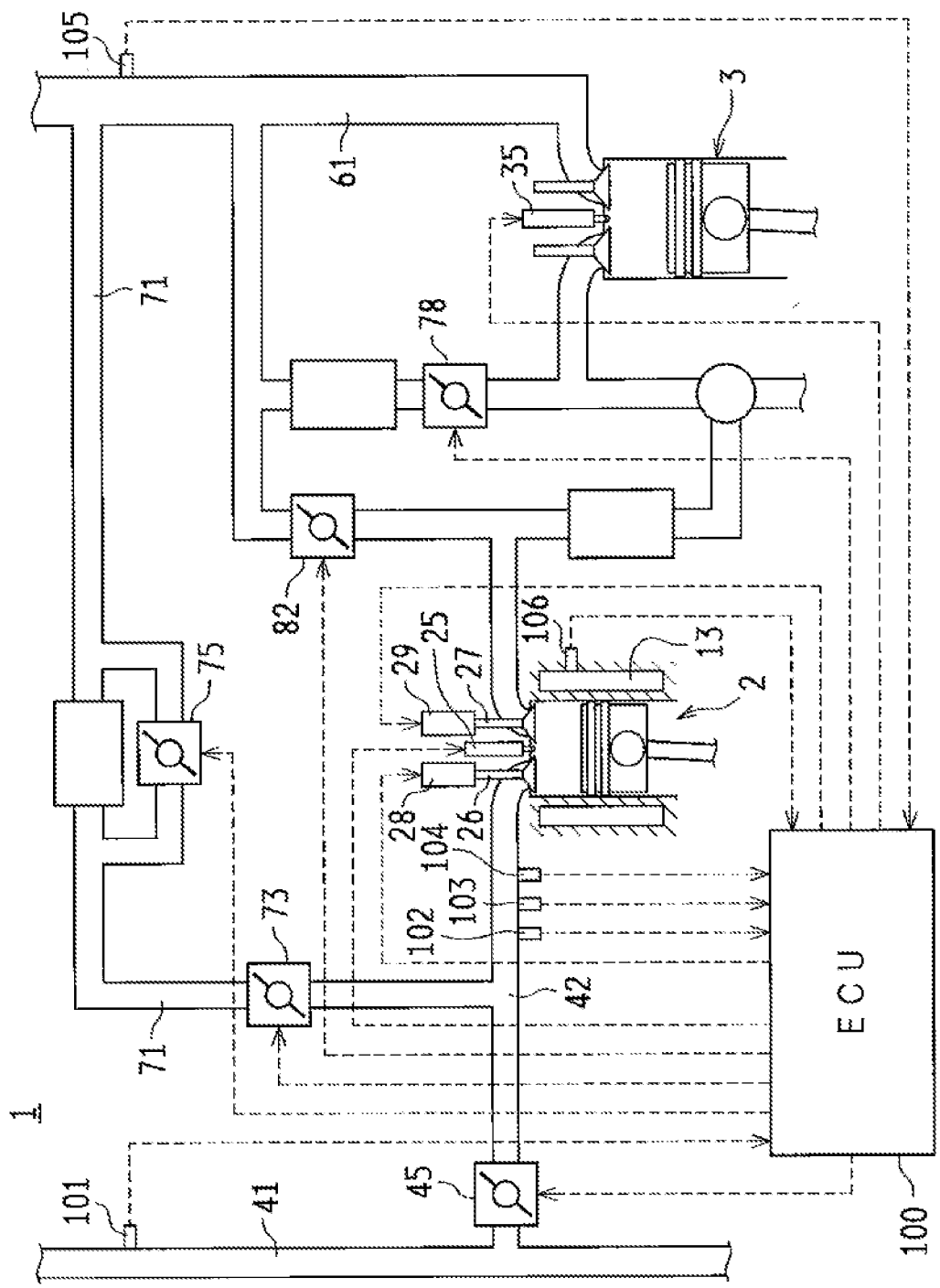
FIG. 2 A diagram showing a schematic structure of a control system of the internal combustion engine.

FIG. 2 is a diagram showing a schematic structure of a control system of the internal combustion engine 1. The internal combustion engine 1 is provided with an ECU (Electronic Control Unit) 100 serving as a control device for controlling various actuators in the internal combustion engine 1. The ECU 100 includes a CPU (Central Processing Unit), a ROM (Read Only Memory), a RAM (Random Access Memory), a backup RAM, and the like.

The ROM stores various control programs, a map which is referred to at a time of executing the various control programs, and the like. The CPU executes arithmetic processing based on the various control programs and maps stored in the ROM. Further, the RAM is a memory for temporarily storing the calculation result of the CPU and data input from various sensors. Further, the backup RAM is a nonvolatile memory which stores data and the like to be saved at a time of system shutdown and the like.

As shown in FIG. 2, the internal combustion engine 1 includes an intake-air flow sensor 101, a taken-in gas pressure sensor 102, a taken-in gas temperature sensor 103, a taken-in gas $O_2$ sensor 104, an exhaust pressure sensor 105, a water temperature sensor 106, and the like.

The intake-air flow sensor 101 transmits, to the ECU 100, an output signal corresponding to the flow rate of the taken-in air (air) flowing in the main air-intake passage 41.

The taken-in gas pressure sensor 102 transmits, to the ECU 100, an output signal corresponding to the pressure of the taken-in gas flowing in the fuel reformation cylinder air-intake passage 42. Specifically, an output signal corresponding to the pressure of the taken-in gas in the fuel reformation cylinder air-intake passage 42, on the downstream side of a portion communicating with the fuel reformation cylinder EGR passage 71 is transmitted to the ECU 100.

The taken-in gas temperature sensor 103 transmits, to the ECU 100, an output signal corresponding to the temperature of the taken-in gas flowing in the fuel reformation cylinder air-intake passage 42. Specifically, an output signal corresponding to the taken-in gas temperature of the fuel reformation cylinder air-intake passage 42, on the downstream side of a portion communicating with the fuel reformation cylinder EGR passage 71 is transmitted to the ECU 100.

The taken-in gas $O_2$ sensor 104 transmits, to the ECU 100, an output signal corresponding to the concentration of oxygen in the taken-in gas flowing in the fuel reformation cylinder air-intake passage 42. Specifically, an output signal corresponding to the oxygen concentration in the taken-in gas in the fuel reformation cylinder air-intake passage 42, on the downstream side of a portion communicating with the fuel reformation cylinder EGR passage 71 is transmitted to the ECU 100.

The exhaust pressure sensor 105 transmits, to the ECU 100, an output signal corresponding to the pressure of the exhaust gas flowing in the exhaust passage 61. Specifically, an output signal corresponding to the exhaust pressure of the exhaust passage 61 on the upstream side of the portion communicating with the fuel reformation cylinder EGR passage 71 is transmitted to the ECU 100.

The water temperature sensor 106 transmits, to the ECU 100, an output signal corresponding to the temperature of the cooling water flowing in the cooling water passage 13 formed in the cylinder block. Specifically, an output signal corresponding to the temperature of the cooling water flowing in the cooling water passage 13 formed around the fuel reformation cylinder 2 is transmitted to the ECU 100.

The ECU 100 is electrically connected to each of the injectors 25, 35, the adjusting valves 45, 73, 75, 78, 82, and the like. Further, the air-intake valve 26 and the exhaust valve 27 of the fuel reformation cylinder 2 are provided with variable valve units 28, 29, respectively. This way, the opening and closing timing of the valves 26, 27 can be adjusted. The ECU 100 is also electrically connected to these variable valve units 28, 29. Based on the output signals from the above described various sensors 101 to 106 and the like, the ECU 100 performs: fuel injection control (opening and closing control of the injectors 25, 35) of the injectors 25, 35; opening and closing control of the adjustment valves 45, 73, 75, 78, 82 (gas flow rate control), and opening and closing timing control of the valves 26, 27 by variable valve units 28, 29.

—Basic Operation of Internal Combustion Engine—

Next, a basic operation of the internal combustion engine 1 configured as described above will be described.

In a basic operation after completion of warming up the internal combustion engine 1 (in a state enabling a reforming reaction of the fuel in the fuel reformation chamber 23), the air introduced into the main air-intake passage 41 is pressurized by the compressor wheel 12a of the turbocharger 12. The air is then branched into the fuel reformation cylinder air-intake passage 42 and the output cylinder air-intake passage 43. At this time, the flow rate of the taken-in air flowing through the fuel reformation cylinder air-intake passage 42 is adjusted by the air-intake amount adjust valve 45. Further, the EGR gas having flown through the fuel reformation cylinder EGR system 7A is introduced into the fuel reformation cylinder air-intake passage 42. At this time, the amount of the EGR gas introduced into the fuel reformation cylinder air-intake passage 42 is adjusted by the EGR gas amount adjusting valve 73. Further, the temperature of the EGR gas introduced into the fuel reformation cylinder air-intake passage 42 is adjusted by the EGR gas amount bypassing the EGR gas cooler 72 according to the opening degree of the bypass amount adjusting valve 75. As a result, the air and the EGR gas are introduced into the fuel reformation chamber 23 of the fuel reformation cylinder 2. At this time, the flow rate of the taken-in air adjusted by the opening degree of the air-intake amount adjust valve 45, the flow rate of the EGR gas adjusted by the opening degree of the EGR gas amount adjusting valve 73, and the temperature of the EGR gas adjusted by the opening degree of the bypass amount adjusting valve 75 are adjusted so as to set a high equivalence ratio in the fuel reformation chamber 23, and to achieve a gas temperature in the fuel reformation chamber 23 that enables favorable fuel reformation. Specifically, the opening degrees of the air-intake amount adjust valve 45, the EGR gas amount adjusting valve 73, and the bypass amount adjusting valve 75 are set so that the equivalence ratio in the fuel reformation chamber 23 at the time of supplying the fuel from the injector 25 to the fuel reformation chamber 23 is, for example, 2.5 or more (preferably, 4.0 or more) and the gas temperature of the fuel reformation chamber 23 is at least a lowest limit value of a reforming reaction enabling temperature (the lower limit value of a temperature range that enables reforming reaction, which varies according to the equivalence ratio in the fuel reformation chamber 23, as will be described later), according to an opening degree setting map prepared in advance based on an experiment or a simulation.

Through the process described above, fuel is supplied from the injector 25 to the fuel reformation chamber 23 while the air and the EGR gas are introduced into the fuel reformation chamber 23 of the fuel reformation cylinder 2. The fuel supply amount from the injector 25 is basically set according to the required engine power. Specifically, the valve opening period of the injector 25 is set so as to achieve a target fuel supply amount according to the fuel pressure in the injector 25. The opening timing of the injector 25 in this case is preferably set such that injection of the target fuel supply amount is completed by the time the air-intake stroke of the fuel reformation cylinder 2 is finished. However, the fuel injection period may be continued up to the middle of the compression stroke, if evenly mixed air-fuel mixture is obtainable before the piston 22 approaches the compression top dead point. This generates a homogeneous mixture (air-fuel mixture having a high equivalence ratio) in the fuel reformation chamber 23 before the piston 22 reaches the compression top dead point.

While the piston 22 moves toward the compression top dead point, the pressure and the temperature of the fuel reformation chamber 23 increase. In the fuel reformation chamber 23, the air-fuel mixture having a high equivalence ratio (e.g., air-fuel mixture having an equivalent ratio of 4.0 or more) is adiabatically compressed. As a result, the dehydrogenation reaction of the fuel, a partial oxidation reaction, a steam reforming reaction, and a thermal dissociation reaction take place under a high temperature and high pressure environment, thus reforming the fuel to generate reformed fuel having a high anti-knock property, such as hydrogen, carbon monoxide, and methane.

The reformed fuel discharged from the fuel reformation chamber 23 is cooled in the reformed fuel cooler 52 while the reformed fuel flows through the reformed fuel supply passage 51. With this cooling, preignition of the reformed fuel in the output cylinder air-intake passage 43 and the combustion chamber 33 is suppressed or reduced. The cooled reformed fuel is then mixed with the air flowing in the output cylinder air-intake passage 43 in the mixer 53, and is supplied to the combustion chamber 33 of the output cylinder 3. Further, the EGR gas amount adjusting valve 78 is opened as needed to introduce the EGR gas into the combustion chamber 33 of the output cylinder 3 through the output cylinder EGR passage 76.

Through the above process, the air, the reformed fuel, and the EGR gas are introduced into the combustion chamber 33 of the output cylinder 3, and the equivalence ratio in the combustion chamber 33 is adjusted to approximately 0.1 to 0.8.

In the compression stroke, the leaned mixed gas is adiabatically compressed in the output cylinder 3. When the piston 32 reaches the compression top dead point, a small amount of fuel is injected from the injector 35. This ignites the air-fuel mixture in the combustion chamber 33, and premixed combustion of the lean mixture is performed. In cases where the air-fuel mixture in the combustion chamber 33 is self-ignited (premixed compression self-ignition) without injection of the fuel from the injector 35, the injection of the fuel from the injector 35 is not necessarily required.

The above combustion reciprocates the piston 32 and rotates the crankshaft 11, thereby outputting an engine power. This engine power is transmitted to the screw shaft. Also, a part of the engine power is used as a drive source for the reciprocating movement of the piston 22 in the fuel reformation cylinder 2.

Further, at a time of cold start of the internal combustion engine 1, a not-shown starter rotates (cranks) the crankshaft 11, and a predetermined amount of fuel is injected from the injectors 25, 35 of the fuel reformation cylinder 2 and the output cylinder 3, respectively. The fuel injection at this time is set so that the equivalence ratio in each of the fuel reformation chamber 23 and the combustion chamber 33 is less than 1. Through the above, compressed ignition combustion takes place in each of the fuel reformation chamber 23 of the fuel reformation cylinder 2 and the combustion chamber 33 of the output cylinder 3. Then, when the warm-up of the fuel reformation cylinder 2 proceeds and the temperature reaches a temperature that enables the reforming reaction, the operation is switched to an operation for generating the reformed fuel (fuel reforming operation). As described above, the fuel reformation cylinder 2 can function as a cylinder for obtaining an engine power as in the case of the output cylinder 3, and can function as a fuel reformation device as hereinabove described.

At the time of stopping supply of the reformed fuel to the output cylinder 3 due to emergency stop and the like of the internal combustion engine 1, the bypass amount adjusting valve 82 is opened. This introduces the reformed fuel into the exhaust passage 61 via the output cylinder bypass passage 81, and stops supply of the reformed fuel to the output cylinder 3.

With this internal combustion engine 1, combustion (uniform lean combustion) of the lean mixture is performed in the output cylinder 3. The NOx emission amount and the soot discharge amount can therefore be reduced. Thus, it is possible to eliminate or significantly reduce the capacity of a post-processing apparatus for purifying exhaust gas. Further, since a fuel with a high anti-knock property is combusted, knocking is suppressed or reduced, and since diesel micro-pilot ignition enables combustion at a suitable timing, the combustion efficiency can be also improved.

—Reforming Reaction Possible Range—

The following describes a condition for enabling a reforming reaction in the fuel reformation chamber 23 of the fuel reformation cylinder 2. To enable the fuel reforming reaction, the equivalence ratio of the air-fuel mixture in the fuel reformation chamber 23 and the temperature of the fuel reformation chamber 23 (gas temperature) both need to be within a range that enables the reforming reaction. Further, the gas temperature required for causing the reforming reaction of the fuel is different depending on the equivalence ratio of the air-fuel mixture in the fuel reformation chamber 23. Therefore, to enable the fuel reforming reaction, the temperature of the fuel reformation chamber 23 needs to be a temperature (temperature which is equal to or higher than the lowest temperature that enables the reforming reaction) according to the equivalence ratio of the air-fuel mixture.

Figure 3:
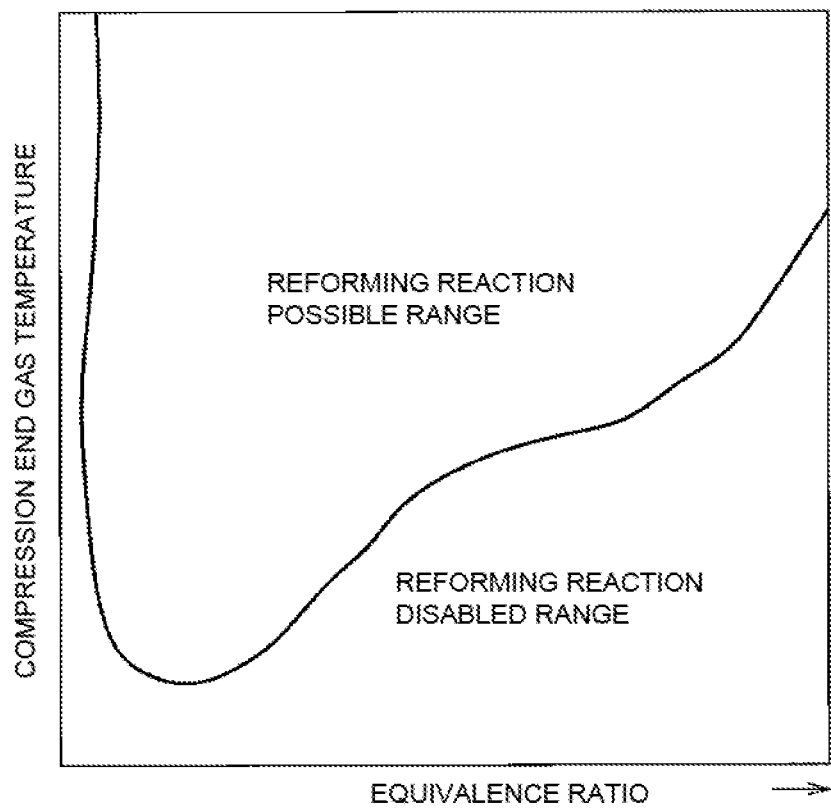
FIG. 3 A diagram showing the relationship among an equivalence ratio, a compression end gas temperature, and a reforming reaction possible range.

FIG. 3 is a diagram showing a relationship amongst an equivalence ratio of air-fuel mixture in the fuel reformation chamber 23 (horizontal axis), a gas temperature in the fuel reformation chamber 23 at a time point when the piston 22 reaches the compression top dead point in the fuel reformation cylinder 2 (hereinafter, compression end gas temperature; vertical axis), and the reforming reaction possible range. As shown in FIG. 3, to enable a reforming reaction in the fuel reformation chamber 23, an equivalent ratio of a predetermined value or more (e.g., 2 or more) is required as an equivalence ratio of the air-fuel mixture in the fuel reformation chamber 23, and the compression end gas temperature required for reforming reaction increases with an increase in the equivalence ratio. That is, to enable reforming reaction in the fuel reformation chamber 23, the compression end gas temperature needs to be increased with an increase in the equivalence ratio of the air-fuel mixture in the fuel reformation chamber 23.

—Control of Fuel Reforming Operation—

Next, the following describes control of the fuel reforming operation, which is a characteristic of the present embodiment. As described above, to generate reformed fuel in the fuel reformation cylinder 2, the equivalence ratio of the air-fuel mixture in the fuel reformation chamber 23 needs to be set higher (reduce the amount of oxygen) to suppress or reduce oxidation reaction (combustion). Therefore, during a state where the reformed fuel is generated, the fuel reformation chamber 23 is in a fuel-rich state. As a result, at the time of generating the reformed fuel, a relatively large amount of reformed fuel is generated in accordance with the amount of fuel in the fuel reformation chamber 23.

If a low-speed operation or a low-load operation of the internal combustion engine 1 is performed, there is a possibility that the amount of reformed fuel generated in the fuel reformation cylinder 2 may exceed the amount of the reformed fuel consumed (combusted) in the output cylinder 3. There will be, a surplus reformed fuel.

The thermal efficiency of the internal combustion engine 1 is lowered in a state where the surplus reformed fuel is generated. Further, the surplus reformed fuel is likely to be emitted to the atmosphere, because it is not consumed in the output cylinder 3. Therefore, the surplus reformed fuel is not desirable in terms of the environment protection.

In view of the above point, in the present embodiment, the fuel reforming operation in the fuel reformation cylinder 2 is controlled so as to balance the amount of reformed fuel generated in the fuel reformation cylinder 2 and the amount of reformed fuel consumed (combusted) in the output cylinder 3. Specifically, the fuel reforming operation in the fuel reformation cylinder 2 is not executed, when the total heat generation quantity on assumption that the reformed fuel (total amount of the reformed fuel) generated within a predetermined period in the fuel reformation cylinder 2 is combusted is estimated as to be more than the required reformed-fuel heat generation quantity required for the predetermined period in the output cylinder 3 (the heat generation quantity obtained by combustion of the reformed fuel in the output cylinder 3 within the predetermined period).

In the control of the fuel reforming operation of the present embodiment, an estimated value of the total heat generation quantity on assumption that the reformed fuel generated in 1 cycle (corresponding to the predetermined period) of the fuel reformation cylinder 2 (hereinafter, estimated reformed fuel heat generation quantity) is combusted is compared with an estimated value of the heat generation quantity of the reformed fuel which is required in the output cylinder 3 (the required reformed-fuel heat generation quantity) within 1 cycle of the fuel reformation cylinder 2. For example, if there is only one output cylinder 3 that reaches the combustion stroke during 1 cycles of the fuel reformation cylinder 2, the required reformed-fuel heat generation quantity required in that one output cylinder 3 having reached its combustion step is compared with the above described estimated reformed fuel heat generation quantity. For example, if there are a plurality of output cylinders 3 that reach their combustion stroke during 1 cycles of the fuel reformation cylinder 2, the total heat quantity of the required reformed-fuel heat generation quantities required in the output cylinders 3 having reached their combustion step is compared with the above described estimated reformed fuel heat generation quantity.

Further, the fuel reforming operation in the fuel reformation cylinder 2 is prohibited (not executed), when the estimated reformed fuel heat generation quantity is more than the required reformed-fuel heat generation quantity. For example, fuel supply from an injector 25 to the fuel reformation chamber 23 is stopped. Alternatively, a predetermined amount of fuel that does not lead to generation of reformed fuel is supplied from the injector 25 to the fuel reformation chamber 23. The fuel supply amount in such a case is set so that the equivalence ratio in the fuel reformation chamber 23 is less than 1. This way, lean mixture is combusted in the fuel reformation chamber 23, and reformed fuel is not generated, or little amount of reformed fuel is generated.

While the fuel reforming operation is prohibited (not executed) in the fuel reformation cylinder 2, fuel is supplied from the injector 35 to the combustion chamber 33 in the output cylinder 3 to obtain a required engine power. The fuel supply amount to the combustion chamber 33 in this case is set so that the equivalence ratio in the combustion chamber 33 is less than 1. This way, combustion of the lean mixture takes place in the combustion chamber 33, thus yielding an engine power of the internal combustion engine 1.

The following sequentially describes calculating operation (estimating operation) of the estimated reformed fuel heat generation quantity, calculating operation (estimating operation) of the required reformed-fuel heat generation quantity, and control of the fuel reforming operation using the estimated reformed fuel heat generation quantity and the required reformed-fuel heat generation quantity.

(Calculating Operation of Estimated Reformed Fuel Heat Generation Quantity)

First, the calculating operation (estimating operation) of the estimated reformed fuel heat generation quantity is described. This estimated reformed fuel heat generation quantity is correlated with the amount of fuel supplied to the fuel reformation chamber 23. Therefore, from this amount of fuel, the estimated reformed fuel heat generation quantity can be easily evaluated.

However, the reforming reaction in the fuel reformation chamber 23 is a combination of an endothermic reaction and an exothermic reaction. For example, a quantity of heat in the fuel reformation chamber 23 (e.g., a quantity of heat obtained from the EGR gas) may be stored as an internal energy of the reformed fuel. In such a case, the heat generation quantity when the reformed fuel is combusted increases by the amount of the internal energy. Therefore, the amount of fuel supplied to the fuel reformation chamber 23 and the estimated reformed fuel heat generation quantity do not necessarily match with each other. In other words, it is difficult to accurately calculate the estimated reformed fuel heat generation quantity from only the amount of fuel supplied to the fuel reformation chamber 23. For this reason, the estimated reformed fuel heat generation quantity is calculated based on the state quantity of the reformed fuel generated, as shown in the following equation (1).

[Formula 1]

$$Q_{rfm} = n_{rfm} \cdot \sum_i \psi_i \cdot q_i \qquad (1)$$

In the formula (1), $Q_{rfm}$ is the estimated reformed fuel heat generation quantity, $n_{rfm}$ is the number of moles of the reformed fuel (reformed gas) generated, $\Psi_i$ is a separate mole fraction of each gas component in the reformed fuel (e.g., hydrogen, carbon monoxide, methane, ethane, and the like), and $q_i$ is the heat generation quantity of each of the gas component in the reformed fuel.

The number of moles $n_{rfm}$ of the reformed fuel is different depending on the operating condition of the internal combustion engine 1 (particularly, the operating condition of the fuel reformation cylinder 2). Therefore, the molar number $n_{rfm}$ of reformed fuel can be calculated from, for example, the following formula (2).

[Formula 2]

$$n_{rfm} = \frac{g_{air} + g_{fuel}}{M_{rfm}} \qquad (2)$$

In this equation (2), $g_{air}$ is the amount of gas introduced into the fuel reformation chamber 23 (gas mass), $g_{fuel}$ is the amount of fuel supplied into the fuel reformation chamber 23, and $M_{rfm}$ is the molar mass of the reformed fuel (reformed gas). In other words, the number of moles $n_{rfm}$ of the reformed fuel is determined according to the amount of gas $g_{air}$ introduced into the fuel reformation chamber 23 and the equivalence ratio of the air-fuel mixture in the fuel reformation chamber 23. The amount of gas $g_{air}$ introduced to the fuel reformation chamber 23 can be calculated based on the output signal from the intake-air flow sensor 101, the opening degree of the air-intake amount adjust valve 45, and the like. Further, the amount of gas $g_{air}$ introduced to the fuel reformation chamber 23 can be also calculated from the pressure of the taken-in gas calculated based on the output signal from the taken-in gas pressure sensor 102 and the temperature of the taken-in gas calculated based on the output signal from the taken-in gas temperature sensor 103. The fuel amount $g_{fuel}$ to the fuel reformation chamber 23 can be calculated from the injection command value for the injector 25. As described above, since the number of moles $n_{rm}$ of the reformed fuel is calculated from the amount of gas $g_{air}$ introduced to the fuel reformation chamber 23 and the amount of the fuel $g_{fuel}$ supplied to the fuel reformation chamber 23, the estimated reformed fuel heat generation quantity $Q_{rfm}$ is calculated by using them as parameters. This corresponds to the total heat generation quantity on assumption that the reformed fuel generated within the predetermined period in the fuel reformation device is combusted being calculated based on at least an amount of gas introduced to the fuel reformation device and a quantity of heat supplied to the fuel reformation device, of the present invention.

Further, the numerator of the right side in the equation (2) correlates with the flow rate of the reformed fuel. Therefore, the number of moles $n_{rfm}$ of the reformed fuel can be calculated also by measuring the gas temperature and the gas pressure at the outlet of the fuel reformation chamber 23 (e.g., by measuring with sensors). In other words, the estimated reformed fuel heat generation quantity $Q_{rfm}$ can be calculated also by using the gas temperature and the gas pressure at the outlet of the fuel reformation chamber 23 as parameters. This corresponds to the total heat generation quantity on assumption that the reformed fuel generated within the predetermined period in the fuel reformation device is combusted being calculated based on at least the temperature and the pressure of gas from the fuel reformation device, of the present invention.

Further, the molar mass $M_{rfm}$ of the reformed fuel can be calculated (estimated) by, for example, the following formula (3).

[Formula 3]

$$M_{rfm} = \sum_i \psi_i \cdot M_i \qquad (3)$$

In this equation (3), $\Psi_i$ is the individual mole fraction of each gas component in the reformed fuel, as described above. Also, $M_i$ is the individual molar mass of each gas component in the reformed fuel.

The individual mole fraction $\Psi_i$ of each gas component in the reformed fuel and the individual molar mass $M_i$ of each gas component in the reformed fuel are determined according to the type of fuel, the equivalence ratio in the fuel reformation chamber 23, the compression end gas temperature, and the like, and can be determined according to a map (a map stored in the ROM) created based on an experiment or a simulation. Further, the individual heat generation quantity $q_i$ of each gas component in the reformed fuel can be calculated based on the individual molar mass $M_i$ of each gas component and the amount of gas $g_{air}$ introduced to the fuel reformation chamber 23.

(Calculating Operation of Required Reformed-Fuel Heat Generation Quantity)

Next, the calculating operation (estimating operation) of the required reformed-fuel heat generation quantity is described.

The present embodiment deals with a case where the heat generation quantity by combustion of a small amount of fuel supplied from the injector 35 into the combustion chamber 33 is small, and where this heat generation quantity is not taken into consideration. To phrase it in a different way, the present embodiment deals with a case where the fuel is not supplied from the injector 35 (as in the case where premixed compression self-ignition of the air-fuel mixture takes place in the combustion chamber 33, as hereinabove described). For this reason, the fuel reforming operation is controlled, assuming that substantially all the heat generation quantity in the combustion chamber 33 is attributed to combustion of the reformed fuel. As to a case of taking into consideration the heat generation quantity attributed to combustion of a small amount of fuel supplied from the injector 35 to the combustion chamber 33, the description will be provided later as a modification.

Thus, as described above, the required reformed-fuel heat generation quantity is substantially equal to the required heat generation quantity in the combustion chamber 33 (hereinafter, referred to as the required output cylinder heat generation quantity). In the following description, the required reformed-fuel heat generation quantity will be referred to as a required output cylinder heat generation quantity.

The required output cylinder heat generation quantity may be calculated (estimated) by using the following formula (4).

[Formula 4]

$$Q_{supply} = \frac{1}{\eta} P_{out} \qquad (4)$$

In the formula (4), $Q_{supply}$ is the required output cylinder heat generation quantity, $\eta$ is the thermal efficiency of the output cylinder 3, and $P_{out}$ is the required engine power.

The thermal efficiency $\eta$ of the output cylinder 3 can be evaluated by an experiment or a simulation. The required engine power $P_{out}$ is calculated based on the rotational speed and the torque required for the screw shaft. As such, when the rotational speed required for the screw shaft is low or when the torque required is low, the required engine power $P_{out}$ also becomes a low value. In other words, a required amount of the reformed fuel supplied to the output cylinder 3 becomes less. That is, the required output cylinder heat generation quantity $Q_{supply}$ becomes less. Further, the required output cylinder heat generation quantity $Q_{supply}$ may be calculated also from the target value of the speed governor provided the internal combustion engine 1.

(Control of Fuel Reforming Operation)

Next, the following describes control of the fuel reforming operation using the estimated reformed fuel heat generation quantity $Q_{rfm}$ and the required output cylinder heat generation quantity $Q_{supply}$.

As is hereinabove described, in the present embodiment, the fuel reforming operation in the fuel reformation cylinder 2 is prohibited (not executed), when the estimated reformed fuel heat generation quantity $Q_{rfm}$ is more than the required output cylinder heat generation quantity (required reformed-fuel heat generation quantity) $Q_{supply}$. For this reason, a difference $\Delta Q$ (a value obtained by subtracting the estimated reformed fuel heat generation quantity $Q_{rfm}$ from the required output cylinder heat generation quantity $Q_{supply}$) is obtained by the following equation (5). When the difference $\Delta Q$ in the heat generation quantity is a negative value, the fuel reforming operation in the fuel reformation cylinder 2 is prohibited (not executed).

[Formula 5]

$$\Delta Q = Q_{supply} - Q_{rfm} \tag{5}$$

Figure 4:
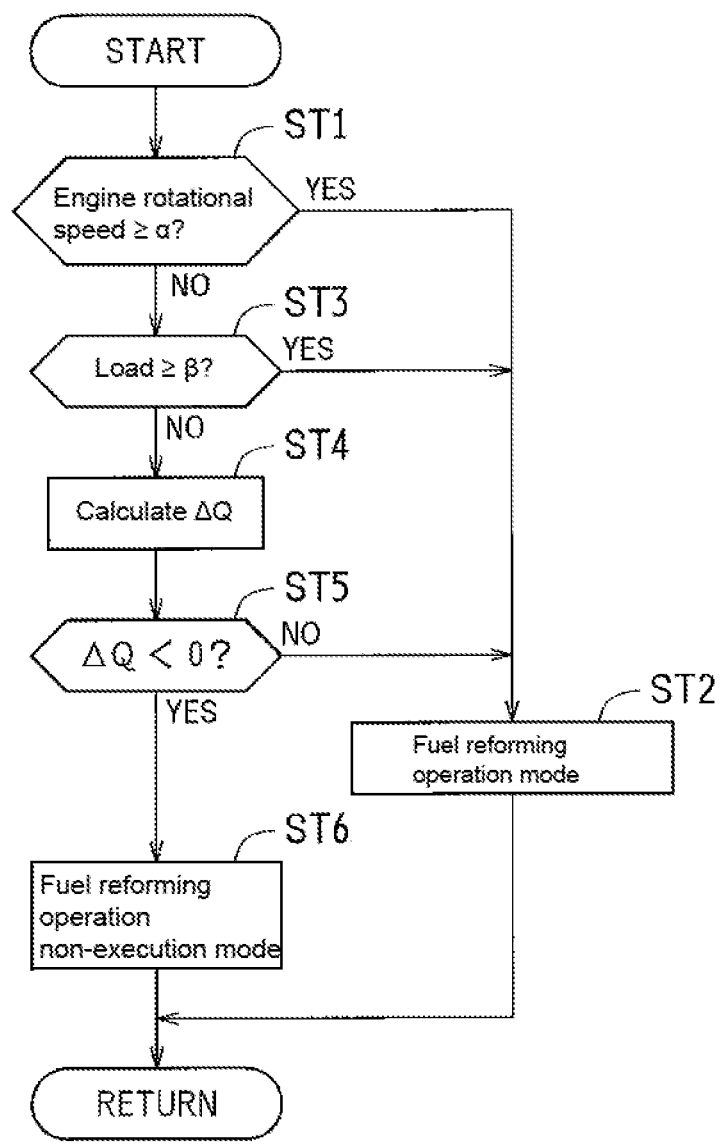
FIG. 4 A flowchart showing a control procedure for performing switching between executing and not-executing of a fuel reforming operation.

FIG. 4 is a flowchart showing a control procedure for performing switching between executing and not-executing of a fuel reforming operation. This flowchart is executed, for example, every 1 cycle of the fuel reformation cylinder 2 in the ECU 100, after starting of the internal combustion engine 1.

First, in the step ST1, whether or not the engine rotational speed (the rotational speed of the output cylinder 3) is equal to or larger than a predetermined threshold value α is determined. This engine rotational speed is calculated based on an output signal from a not-shown crank position sensor. Further, the threshold value α is set based on an experiment or a simulation, as an upper limit value of an engine rotational speed range which may generate, in the fuel reformation cylinder 2, an amount of reformed fuel that exceeds the amount of reformed fuel consumed in the output cylinder 3 (corresponding to a required reformed-fuel heat generation quantity (required output cylinder heat generation quantity $Q_{supply}$) for a predetermined period required in the output cylinder 3).

If the engine rotational speed is equal to or higher than the threshold value α and the step ST1 results in YES, the process proceeds to the step ST2, and the fuel reforming operation is executed assuming that an amount of reformed fuel exceeding the amount of reformed fuel consumed in the output cylinder 3 will not be or unlikely to be generated in the fuel reformation cylinder 2 (the surplus reformed fuel will not be or unlikely to be generated). That is, the operation mode of the internal combustion engine 1 turns into a fuel reforming operation mode. As described in the basic operation of the internal combustion engine 1, in the fuel reforming operation mode, the fuel is supplied from the injector 25 to the fuel reformation chamber 23 (fuel is supplied to set a high equivalence ratio in the fuel reformation chamber 23 for enabling the reforming reaction). Further, the required engine power can be obtained by combustion of reformed fuel in the output cylinder 3.

Meanwhile, if the engine rotational speed is less than the threshold value α and the step ST1 results in NO, the process proceeds to the step ST3, and whether or not the load (engine load) of the output cylinder 3 is equal to or larger than a predetermined threshold value β is determined. This load is set based on the required engine power $P_{out}$. Further, the threshold value β is set based on an experiment or a simulation, as an upper limit value of an engine load range which may generate, in the fuel reformation cylinder 2, an amount of reformed fuel that exceeds the amount of reformed fuel consumed in the output cylinder 3 (corresponding to a required reformed-fuel heat generation quantity (required output cylinder heat generation quantity $Q_{supply}$) for a predetermined period required in the output cylinder 3).

If the load of the output cylinder 3 is equal to or higher than the threshold value β and the step ST3 results in YES, the process proceeds to the step ST2, and the fuel reforming operation is executed assuming that an amount of reformed fuel exceeding the amount of reformed fuel consumed in the output cylinder 3 will not be or unlikely to be generated in the fuel reformation cylinder 2 (the surplus reformed fuel will not be or unlikely to be generated). That is, the operation mode of the internal combustion engine 1 turns into the above-mentioned fuel reforming operation mode.

Meanwhile, if the load of the output cylinder 3 is less than the threshold value β and the step ST3 results in NO, the process proceeds to the step ST4, and the difference $\Delta Q$ of the heat generation quantity is calculated by the above formula (5). That is, the difference $\Delta Q$ of the heat generation quantity is calculated by subtracting the estimated reformed fuel heat generation quantity $Q_{rfm}$ calculated by the above formula (1) from the required output cylinder heat generation quantity $Q_{supply}$ calculated by the above formula (4).

Thereafter, the process proceeds to the step ST5, and whether or not the difference $\Delta Q$ in the heat generation quantity is a negative value is determined. In other words, whether or not the estimated reformed fuel heat generation quantity $Q_{rfm}$ is larger than the required output cylinder heat generation quantity $Q_{supply}$ is determined.

When the difference $\Delta Q$ of the heat generation quantity is zero or a positive value and the step ST5 results in NO, the process proceeds to the step ST2, and the fuel reforming operation is executed assuming that there is no possibility that the surplus reformed fuel may be generated. That is, the operation mode of the internal combustion engine 1 turns into the above-mentioned fuel reforming operation mode.

On the other hand, when the difference $\Delta Q$ of the heat generation quantity is a negative value and the step ST5 results in YES, the process proceeds to the step ST6, and the fuel reforming operation is executed assuming that there is a possibility that the surplus reformed fuel may be generated. In other words, the operation mode of the internal combustion engine 1 is in the fuel reforming operation non-execution mode.

For example, in a case where fuel (fuel for generating reformed fuel) has already been supplied from the injector 25 to the fuel reformation chamber 23 (when the fuel is supplied to the fuel reformation chamber 23 from the injector 25, at a point when it is determined that the difference $\Delta Q$ in the heat generation quantity has a negative value), the fuel reforming operation is not executed in the next cycle in the fuel reformation cylinder 2. Further, in a case where fuel (fuel for generating reformed fuel) is not supplied from the injector 25 to the fuel reformation chamber 23 (the difference $\Delta Q$ of the heat generation quantity is determined as to be a negative value before the supply of fuel, by estimating (estimating before the supply of the fuel) both the estimated reformed fuel heat generation quantity $Q_{rfm}$ and the required output cylinder heat generation quantity $Q_{supply}$), the fuel reforming operation is not executed in the present cycle of the fuel reformation cylinder 2.

When the fuel reforming operation is not executed as hereinabove described, fuel supply from the injector 25 to the fuel reformation chamber 23 is stopped. Alternatively, a predetermined amount of fuel that does not lead to generation of reformed fuel is supplied from the injector 25 to the fuel reformation chamber 23. The fuel supply amount in such a case is set so that the equivalence ratio in the fuel reformation chamber 23 is less than 1. This way, lean mixture is combusted in the fuel reformation chamber 23, and reformed fuel is not generated, or little amount of reformed fuel is generated.

While the fuel reforming operation is prohibited (not executed) in the fuel reformation cylinder 2, fuel is supplied from the injector 35 to the combustion chamber 33 in the output cylinder 3 to obtain a required engine power. The fuel supply amount to the combustion chamber 33 in this case is set so that the equivalence ratio in the combustion chamber 33 is less than 1.

In this case, the bypass amount adjusting valve 82 is opened. This way, the exhaust gas from the fuel reformation chamber 23 is discharged to the exhaust passage 61 via the output cylinder bypass passage 81. Thus, combustion in the output cylinder 3 is suppressed or reduced from being deteriorated due to the gas discharged from the fuel reformation chamber 23.

As described above, when the fuel reforming operation in the fuel reformation cylinder 2 is prohibited (not executed), reformed fuel is not generated in the fuel reformation chamber 23. Therefore, the estimated reformed fuel heat generation quantity $Q_{rfm}$ calculated by the above formula (1) will be zero or significantly lower than the case of executing the fuel reforming operation. Therefore, in the next routine, if the engine rotational speed is less than the threshold value α (NO in the step ST1) and the load of the output cylinder 3 (engine load) is less than the threshold value β (NO in Step ST3), the step ST5 results in NO and the fuel reforming operation will be executed. That is, the operation mode of the internal combustion engine 1 returns to the fuel reforming operation mode.

The above operation is repeated. The above steps ST5, ST6 correspond to an operation by the reforming operation control unit of the present invention, wherein "the fuel reforming operation in the fuel reformation device is not executed, when the total heat generation quantity on assumption that the reformed fuel generated within the predetermined period in the fuel reformation device is combusted is estimated as to be more than a required reformed-fuel heat generation quantity required for a predetermined period in the output cylinder".

The control of the fuel reforming operation is executed by the ECU 100. Therefore, the functional part of the ECU 100 that executes this control corresponds to the control device described in the present invention. Further, a method of control executed by the ECU 100 corresponds to a control method referred to in the present invention.

In the present embodiment, the fuel reforming operation in the fuel reformation cylinder 2 is not executed, when the total heat generation quantity (the estimated reformed fuel heat generation quantity $Q_{rfm}$) assuming that the reformed fuel generated within the predetermined period (e.g., in 1 cycle) in the fuel reformation cylinder 2 is combusted is estimated as to be more than a required reformed-fuel heat generation quantity (the required output cylinder heat generation quantity $Q_{supply}$) required for a predetermined period in the output cylinder 3. Thus, an amount of reformed fuel that exceeds an amount of reformed fuel consumed in the output cylinder 3 is suppressed or reduced from being generated in the fuel reformation cylinder 2. In other words, generation of surplus reformed fuel is suppressed or reduced. Therefore, a drop in the thermal efficiency of the internal combustion engine 1 can be suppressed or reduced, and emission of the reformed fuel to the atmosphere can be suppressed or reduced.

In the present embodiment, whether the estimated reformed fuel heat generation quantity $Q_{rfm}$ is more than the required output cylinder heat generation quantity $Q_{supply}$ is determined only in an operation area that causes a higher possibility of generating an amount of reformed fuel in the fuel reformation cylinder 2, the amount of reformed fuel exceeding an amount of reformed fuel consumed in the output cylinder 3, i.e., only in an operation area that causes a high possibility of generating surplus reformed fuel (operation area in which the rotational speed and the engine load of the output cylinder 3 is less than a predetermined threshold value) (when the step ST1 and the step ST3 both results in NO). In other words, the above process of determination is not performed in an operation area that leads to a low possibility of generating the surplus reformed fuel. This way, unnecessary determination process is avoided, and reduces the burden in computation in the ECU 100.

Further, in a case of not executing the fuel reforming operation, the lean mixture is combusted in the fuel reformation chamber 23 as described above, when a predetermined amount of fuel is supplied from the injector 25 to the fuel reformation chamber 23 (an amount that makes the equivalence ratio of the fuel reformation chamber 23 less than 1). Further, even when the fuel reforming operation is not executed, combustion of the fuel in the fuel reformation chamber 23 can suppress or reduce a drop in the temperature of the fuel reformation chamber 23. When the temperature of the fuel reformation chamber 23 drops and the gas temperature in the fuel reformation chamber 23 becomes less than the reforming operation enabling temperature, reformed fuel may not be generated when the fuel reforming operation is restarted. However, by the combustion of the fuel in the fuel reformation chamber 23 as described above, the temperature of the fuel reformation chamber 23 can be maintained high, even when the fuel reforming operation is not executed. Therefore, reformed fuel can be favorably generated when the fuel reforming operation is restarted.

—Modification—

The following describes a modification. In the present embodiment, the fuel reforming operation in the fuel reformation cylinder 2 is prohibited (not executed), when the estimated reformed fuel heat generation quantity $Q_{rfm}$ is compared with the required output cylinder heat generation quantity $Q_{supply}$, and the estimated reformed fuel heat generation quantity $Q_{rfm}$ is estimated to be more than the required output cylinder heat generation quantity $Q_{supply}$.

In the present modification, the fuel reforming operation is controlled in consideration of the heat generation quantity by combustion of a small amount of fuel supplied from the injector 35 to the output cylinder 3 (a small amount of fuel supplied when the piston 32 reaches the compression top dead point; an ignition timing controlling fuel).

Specifically, when the fuel for controlling the ignition timing in the output cylinder 3 is injected from the injector 35 into the combustion chamber 33, it is possible to reduce, by the heat generation quantity attributed to combustion of the fuel in the combustion chamber 33, the required reformed-fuel heat generation quantity (required value for heat generation quantity obtained by combustion of reformed fuel in the combustion chamber 33). In short, the amount of reformed fuel to be generated in the fuel reformation cylinder 2 can be reduced.

Taking this into account, in the present solution, the required reformed-fuel heat generation quantity is evaluated as a value resulting from subtracting a quantity of heat generated by combustion of ignition timing controlling fuel supplied in the predetermined period, from the required output cylinder heat generation quantity $Q_{supply}$ (the total heat generation quantity required for the predetermined period in the output cylinder 3). Further, the fuel reforming operation in the fuel reformation cylinder 2 is not executed, when the estimated reformed fuel heat generation quantity is more than the required reformed-fuel heat generation quantity $Q_{rfm}$.

In the present modification, the difference $\Delta Q$ between the heat generation quantities is calculated by the following formula (6).

[Formula 6]

$$\Delta Q = Q_{supply} - Q_{rfm} - Q_{pilot} \quad (6)$$

In this formula (6), $Q_{pilot}$ is the heat generation quantity by combustion of the ignition timing controlling fuel injected from the injector 35, and is obtained based on an experiment or a simulation. Therefore, in the present modification, a value obtained by subtracting the heat generation quantity $Q_{pilot}$ by combustion of the ignition timing controlling fuel from the required output cylinder heat generation quantity $Q_{supply}$ (i.e., $Q_{supply} - Q_{pilot}$) corresponds to the required reformed-fuel heat generation quantity.

Then, when the difference $\Delta Q$ in the heat generation quantity calculated in the formula (6) is zero or a positive value, it is determined as not to be in a state that the surplus reformed fuel is generated, and the fuel reforming operation is executed. That is, the operation mode of the internal combustion engine 1 turns into the above-mentioned fuel reforming operation mode. On the other hand, when the difference $\Delta Q$ of the heat generation quantity is a negative value, the fuel reforming operation is executed assuming that there is a possibility that the surplus reformed fuel may be generated.

Other structures and operations are the same as those of the above embodiment.

With the present modification, while ignition timing of the reformed fuel in the combustion chamber 33 is controlled, an amount of reformed fuel that exceeds an amount of reformed fuel consumed in the combustion chamber 33 is suppressed or reduced from being generated in the fuel reformation cylinder 2. Therefore, generation of surplus reformed fuel can be suppressed or reduced.

Other Embodiments

Note that the above embodiments and modifications are illustrative in all respects, and is not intended to be a basis for limiting interpretation. Accordingly, the scope of the present invention is not to be interpreted solely by the foregoing embodiments and modifications, but is defined based on the description of the appended claims. Further, the technical scope of the present invention includes all changes within the meaning and scope of the appended claims.

For example, the above embodiments and modifications deal with a case where the present invention is applied to an internal combustion engine 1 for a ship, but the present invention is also applicable to an internal combustion engine in other applications (e.g., an electric power generator, a vehicle, and the like).

Further, the above embodiments and modifications deal with a case where the injectors 25, 35 of the cylinders 2, 3 are direct injection type which directly inject fuel into the cylinders. The present invention is not limited to this, and either or both of the injectors 25, 35 may be of a port injection type.

Further, the above embodiment deals with a case where the fuel to be supplied to the fuel reformation chamber 23 is light oil. The present invention is not limited to this, and the fuel may be heavy oil, gasoline, or the like.

Further, the above embodiments and modifications deal with a case where the fuel reformation cylinder 2 and the output cylinder 3 are operated at the same rotational speed. The present invention is not limited to this, and the speed reducer may be interposed between the cylinders 2, 3 (to the crankshaft 11 between the cylinders 2, 3), and the rotational speed of the fuel reformation cylinder 2 may be lower than the rotational speed of the output cylinder 3.

Further, the above embodiments and modifications deal with a case where the engine power obtained from the output cylinder 3 is partially used as a drive source for reciprocation of the piston 22 in the fuel reformation cylinder 2. The present invention is not limited to this, and the drive source for the fuel reformation cylinder 2 may be provided separately. For example, the fuel reformation cylinder 2 and the output cylinder 3 may be separately arranged (arranged without being connected by the crankshaft 11), and the piston 22 of the fuel reformation cylinder 2 may be reciprocated by an electric motor or the like.

The above embodiments and modifications deal with a case where the present invention is applied to an internal combustion engine 1 configured to generate reformed fuel in its fuel reformation cylinder 2. However, application of the present invention is not limited to this, and the present invention may be applied to an internal combustion engine configured to generate reformed fuel by using a fuel reforming catalyst. In this case, for example, the equivalence ratio inside the fuel reforming catalyst is set to be slightly higher than "1", and the reformed fuel is generated by warming the fuel reforming catalyst using the quantity of heat from the exhaust gas, and this reformed fuel is supplied to the output cylinder 3. Further, in this case, when the total heat generation quantity on assumption that the reformed fuel generated within a predetermined period in the fuel reforming catalyst based on the equivalence ratio or the temperature of the fuel reforming catalyst is combusted is estimated as to be more than a required reformed-fuel heat generation quantity required in the predetermined period for the output cylinder 3, the fuel reforming operation is not executed in the fuel reforming catalyst (supply of fuel inside the fuel reforming catalyst is stopped).

Further, in the above embodiment and modification, the timing for injecting a small amount of fuel (ignition timing controlling fuel) from the injector 35 into the combustion chamber 33 is defined as the time point when the piston 32 reaches the compression top dead point. The present invention however is not limited to this, and a small amount of fuel may be injected from the injector 35 at an advanced angle side, or may be injected from the injector 35 at a retarded angle side, from the time point when the piston 32 reaches the compression top dead point.

Further, in the above embodiment and modification, the calculation period for the estimated reformed fuel heat generation quantity $Q_{rfm}$ (the predetermined period of the present invention) is defined as 1 cycle of the fuel reformation cylinder 2. The present invention however is not limited to this, and the estimated reformed fuel heat generation quantity $Q_{rfm}$ may be calculated in relation to the reformed fuel generated over a plurality of cycles of the fuel reformation cylinder 2 (in a period including a plurality of cycles). In this case, the calculation period of the required reformed-fuel heat generation quantity is also set as a period accordingly.

Further, the output cylinder 3 in the above embodiment and the modified example may be of a spark ignition type.

This application claims priority from Japanese Patent Application No. 2016-139572, filed in Japan on Jul. 14, 2016. The entire content of the application is hereby incorporated in the present application by reference.

INDUSTRIAL APPLICABILITY

The present invention is applicable to control of an internal combustion engine including a fuel reformation cylinder and an output cylinder.

REFERENCE SIGNS LIST 1 internal combustion engine
2 fuel reformation cylinder (fuel reformation device)
21, 31 cylinder bore
22, 32 piston
23 fuel reformation chamber
25, 35 injector
3 output cylinder
33 combustion chamber
100 ECU

The invention claimed is:

1. A control device for an internal combustion engine including a fuel reformation device capable of generating reformed fuel through a fuel reforming operation and an output cylinder to which the reformed fuel generated in the fuel reformation device is supplied, the output cylinder being configured to yield an engine power by combusting the reformed fuel, the control device comprising:
a reforming operation control unit configured not to execute the fuel reforming operation in the fuel reforming device, when a total heat generation quantity on assumption that reformed fuel generated within a predetermined period in the fuel reformation device is combusted is estimated to be more than a required reformed-fuel heat generation quantity required in the predetermined period for the output cylinder.

2. The control device according to claim 1, wherein:
the total heat generation quantity on assumption that the reformed fuel generated within the predetermined period in the fuel reformation device is combusted is calculated based on at least an amount of gas introduced to the fuel reformation device and a quantity of fuel supplied to the fuel reformation device.

3. The control device according to claim 1, wherein:
the total heat generation quantity on assumption that the reformed fuel generated within the predetermined period in the fuel reformation device is combusted is calculated based on at least a temperature and a pressure of gas from the fuel reformation device.

4. The control device according to claim 1, wherein:
the reforming operation control unit is configured to determine whether the total heat generation quantity on assumption that the reformed fuel generated within the predetermined period in the fuel reformation device is combusted is more than the required reformed-fuel heat generation quantity required for the predetermined period in the output cylinder, only when each of a rotational speed and a load of the output cylinder is less than a predetermined threshold value, and configured not to execute the fuel reforming operation in the fuel reformation device, if the total heat generation quantity is estimated to be more than the required reformed-fuel heat generation quantity.

5. The control device according to claim 1, wherein:
when the fuel reforming operation in the fuel reformation device is not executed, a fuel supply to the fuel reformation device is stopped, and an amount of fuel within a range that allows fuel combustion and that makes an equivalence ratio less than 1 is supplied to the output cylinder.

6. The control device according to claim 1, wherein:
when the fuel reforming operation in the fuel reformation device is not executed, an amount of fuel within a range that allows fuel combustion and that makes an equivalence ratio less than 1 is supplied to each of the fuel reformation device and the output cylinder.

7. The control device according to claim 1, wherein:
the output cylinder is structured as a reciprocation type in which a piston reciprocates in the cylinder, and an ignition timing of the reformed fuel in the output cylinder is controlled by a fuel supply to the output cylinder or a spark ignition; and
the reforming operation control unit is configured to evaluate, as the required reformed-fuel heat generation quantity, a value resulting from subtracting a quantity of heat generated by combustion of ignition timing controlling fuel that is for controlling the ignition timing and that is supplied in the predetermined period, from a total heat generation quantity required for the predetermined period in the output cylinder, and configured not to execute the fuel reforming operation in the fuel reforming device, when the total heat generation quantity on assumption that the reformed fuel generated within the predetermined period in the fuel reformation device is combusted is estimated to be more than the required reformed-fuel heat generation quantity.

8. A control method for an internal combustion engine including a fuel reformation device capable of generating reformed fuel through a fuel reforming operation and an output cylinder to which the reformed fuel generated in the fuel reformation device is supplied, the output cylinder being configured to yield an engine power by combusting the reformed fuel, wherein:
the method executes no fuel reforming operation in the fuel reformation device, when a total heat generation quantity on assumption that the reformed fuel generated within a predetermined period in the fuel reformation device is combusted is estimated to be more than a required reformed-fuel heat generation quantity required in the predetermined period for the output cylinder.

* * * * *